(12) United States Patent
Yamamoto

(10) Patent No.: US 7,054,899 B1
(45) Date of Patent: May 30, 2006

(54) APPLICATION OF MOBILE AGENT IN A WORKFLOW ENVIRONMENT HAVING A PLURALITY OF IMAGE PROCESSING AND/ OR IMAGE FORMING APPARATUSES

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 09/363,025

(22) Filed: Jul. 29, 1999

(30) Foreign Application Priority Data

Jul. 31, 1998 (JP) ............................................ 10-230086

(51) Int. Cl.
*G06F 15/16* (2006.01)

(52) U.S. Cl. ...................... 709/202; 709/201; 719/317; 358/1.13

(58) Field of Classification Search .................. 700/90, 700/213, 225–227; 358/500, 487, 479, 475, 358/474, 471, 468, 443, 462, 407, 406, 404, 358/402, 43, 1.14, 1.15; 709/310, 313, 317, 709/202–203
See application file for complete search history.

(56) References Cited

U.S. PATENT DOCUMENTS

| | | | | |
|---|---|---|---|---|
| 5,550,957 A | * | 8/1996 | Davidson et al. | 358/1.13 |
| 5,603,031 A | | 2/1997 | White et al. | |
| 5,625,757 A | | 4/1997 | Kageyama et al. | |
| 6,069,707 A | * | 5/2000 | Pekelman | 358/1.6 |
| 6,085,222 A | * | 7/2000 | Fujino et al. | 709/202 |
| 6,134,580 A | * | 10/2000 | Tahara et al. | 709/202 |
| 6,333,790 B1 | * | 12/2001 | Kageyama et al. | 358/1.15 |
| 6,401,073 B1 | * | 6/2002 | Tokuda et al. | 705/8 |
| 6,441,920 B1 | * | 8/2002 | Smith | 358/1.2 |
| 2002/0042810 A1 | * | 4/2002 | Minami et al. | 709/203 |

FOREIGN PATENT DOCUMENTS

| | | |
|---|---|---|
| EP | 0 634 719 A2 | 1/1995 |
| EP | 0 751 651 A2 | 1/1997 |
| JP | 07-121324 | 5/1995 |
| JP | 09-179833 | 7/1997 |
| JP | 09-330296 | 12/1997 |
| JP | 10-80090 | 3/1998 |
| JP | 1110143 A * | 4/1999 |
| WO | WO 95/00898 | 1/1995 |
| WO | WO 98/21662 * | 5/1998 |

* cited by examiner

*Primary Examiner*—Wen-Tai Lin
(74) *Attorney, Agent, or Firm*—Fitzpatrick, Cella, Harper & Scinto

(57) ABSTRACT

By simply logically connecting a client computer and an office apparatus together for a minimum required amount of time and allowing them to engage in a minimum required amount of interactions, the client computer can fully, easily, and expandably control a desired service of the office apparatus. In addition, the office apparatus can provide the client computer with response information required for processing in the client computer or can fully, easily, and expandably control a desired service provided by another apparatus. The present invention provides an office apparatus, a network system, and their control method all of which enable the above operations.

33 Claims, 12 Drawing Sheets

FIG. 9

Printing has been abnormally terminated due to unrecoverable error in Printer1.

Print Agent: #999; taro@client1; 8:30 am

Printing has been abnormally terminated due to no paper in Printer1.
Please supply paper.

Print Agent: #999; taro@client1; 8:30 am

OK

APPLICATION OF MOBILE AGENT IN A WORKFLOW ENVIRONMENT HAVING A PLURALITY OF IMAGE PROCESSING AND/OR IMAGE FORMING APPARATUSES

BACKGROUND OF THE INVENTION

1. Field of the Invention

The present invention relates to an office apparatus connected to a network, a network system connected to a network, and a method for controlling them, and in particular, to an office apparatus having a mobile agent execution environment, a network system having a mobile agent execution environment, and a method for controlling them.

2. Related Background Art

Most conventional office apparatuses individually provide closed functions without being connected to a network. In recent years, office apparatuses, which were individually used, have been connected to a network such as Ethernet so as to be shared by a plurality of computers acting as clients.

If client computers use such an office apparatus via a network, the conventional method allows these client computers to control this office apparatus. This method assumes that network connectivity is constantly maintained during office processing.

If, for example, a program executed on a workstation, a personal computer, or a portable information terminal device acting as a client computer uses a service that can be provided by an office apparatus, the client computer sends data required for an instruction (request) or processing, to a server program executed by this office apparatus in order to control the operation of the apparatus. Furthermore, the client computer receives a response or required data from the office apparatus. The client computer understands the contents of the response and correspondingly sends a new instruction (request) to the office apparatus.

Therefore, while client computers use a service provided by an office apparatus, interactions between the client computers and the office apparatus are repeated constantly.

In addition, there has recently been a demand for a system capable of combining together services provided by multiple office apparatuses connected to a network in order to implement work flow services. Such services automatically execute as a series of processing, processing conventionally implemented by a user moving among these apparatuses.

For example, a user searches an image file for desired image data. The image data is attached to a file in a PDL form created by a word processor in order to generate print data. The print data is printed by a printer as 20 copies for staple processing. Furthermore, this image data is sent to three destinations by facsimile. Services are required in which such multiple processings are executed as a series of processing by multiple cooperating office apparatuses connected to a network.

To meet this demand, an operation is conventionally repeated in which a single client computer is sequentially connected to multiple office apparatuses to control them using an interactive processing protocol. This operation has already combined multiple apparatuses to implement composite services.

On the other hand, in the field of distributed processing executed by a network consisting of only computers, remote procedure call techniques for executing distributed processing using the interactive processing protocol have been developed and techniques called "mobile agents" have been proposed in which program objects that can be executed by computers move through a network for distributed processing.

Known examples of implemented distributed processing systems using mobile agents include Telescript disclosed in U.S. Pat. No. 5,603,031 to General Magic and Aglets (utilizing Java) developed by IBM Tokyo Basic Research Institute.

An image processing apparatus and its control method have been proposed that receive a mobile agent to interpret a command train described in the received mobile agent in order to control the functions of a relevant apparatus (Japanese Patent Application No. 10-80090).

SUMMARY OF THE INVENTION

In the conventional control of office apparatuses via a network, however, a client computer and an office apparatus remotely installed via a network execute a client and a server processes, respectively. The client process is executed by a processor in a client computer to remote-control a service provided by an office apparatus; and the server process is executed by processor in an office apparatus to control the physical mechanism of the office apparatus in order to implement a service provided by the office apparatus. Consequently, the conventional method has the following problems.

First, in the conventional office apparatus control using continuous and interactive communication, detailed control, in particular, control for sophisticated information transmission from an office apparatus to a client computer is difficult due to the need to reduce network traffic.

That is, a client process sends a server process a request for a service or data required to process a service, and in response to this request, a server process controls the physical mechanism of an office apparatus to return a response or the result of processing to the client process. As the control of the requested service becomes more and more detailed, more and more such interactions must be repeated.

The requirement of the client computer's detailed control of a service provided by an office apparatus shared via a network has recently been considered to be particularly important. An attempt to meet this demand using interactive information exchanges based on the conventional control protocol may deteriorate network congestion. This forces users to use more expensive higher-performance client infrastructures. This is economically disadvantageous.

In addition, in conventional office apparatuses, once processing on an office apparatus has been completed, it is substantially difficult for the office apparatus to communicate information on the completed processing to the client computer. If, for example, a client computer remote-controls a printer via a network, it is essentially impossible to directly control this office apparatus using the interactive protocol because a spool of an application server for spooling a script for transferred data is interposed between the client computer and the printer.

For the above reasons, it is difficult or totally impossible in some systems for a client computer requesting printout from a printer to know the timing with which the last page of data has been printed out (the true completion of printing). Otherwise, the network traffic increases.

Second, if an office apparatus desires to provide sufficient information transmission to a client computer, it must simultaneously execute both its original processing and interactive processing with the client computer. Consequently, there are heavy loads on the processing system of the office apparatus, thereby increasing the costs of the office apparatus.

For example, in order to improve throughput, a printer that has executed printing requested by a client computer and has finished outputting the last page must simultaneously start both reporting to the client computer the result of processing concerning the request and executing the next printing requested by another client computer. To implement this operation, however, interactions must be maintained between the client and server processes using the control protocol as described above during the execution of processes required for the office apparatus to provide the service, for example, interpretation and expansion of PDL (Page Description Language), paper feeding, image formation, and ejection of output paper.

An office apparatus must concurrently carry out the control of its physical mechanism for providing services and communication via a network, so it is subjected to very heavy burdens. Such burdens are particularly heavy if the office apparatus is of a multi-client type that provides services in response to requests from multiple client computers.

In addition, for an office apparatus to maintain the control of its physical mechanism and communication via a network, a processor in the office apparatus must have high performance and memory of a large capacity. These requirements increase the costs of the office apparatus body.

Third, in the method for using a communication protocol to implement interactive processing for controlling an office apparatus, a command scheme for controlling the office apparatus must be designed as a protocol and implemented beforehand. Thus, if a new method for operating this office apparatus is developed in the future, the command protocol must be expanded and both the client and server processes changed so as to correspond to the new command protocol (version up) before the benefits of this method can be obtained.

This is cumbersome to users and updating programs requires high costs or is totally impossible particularly because programs for server processes incorporated in conventional office apparatuses, which are generally called "firmware", are located in non-volatile memory. Accordingly, services provided by office apparatuses cannot be expanded appropriately.

Exceptionally, a method may be contemplated in which a client computer sends an office apparatus a server program executed by this office apparatus so as to carry out interactive communication with a server process executed by this program. Alternatively, an office apparatus may dynamically download a relevant control program so as to allow a server process executed by this control program to interactively communicate with a client computer. Such methods can expand the control of apparatuses to some degree using the framework of Java but cannot solve the first and second problems described above.

In addition, conventionally, a client process executed by a client computer sequentially and interactively controls a service provided by an office apparatus using a network connection with a server process executed by this office apparatus, as described above. Thus, to combine multiple office apparatuses to implement work flow services, the client process must continue interactions with the server process executed by each office apparatus during a series of processing. Consequently, there are the following problems.

First, due to heavy burdens on a network infrastructure connecting a client process and multiple server processes together, the user must provide an expensive high-performance network infrastructure and this is economically disadvantageous. In addition, a network of a small bandwidth cannot provide sufficient functions. Furthermore, a dialup network making intermittent connections poses a problem during operation.

Second, due to heavy burdens on a computer infrastructure executing client processes, other processing that is to be executed on that terminal before the service has been completed makes little progress. Thus, the user must provide a more expensive higher-performance client computer and this is not economically disadvantageous.

Third, in the method for using a protocol to implement a series of interactive processing for controlling an office apparatus, a command scheme for controlling the office apparatus must be designed as a protocol and implemented beforehand. Thus, both the client and server processes must be carefully implemented so as to correspond to this protocol.

Consequently, it has been very difficult to effectively combine multiple office apparatuses so that a client computer allows these office apparatuses to execute free work flows.

Fourth, to avoid the unwanted congestion of network traffic caused by the intermediation among multiple office apparatuses carried out by a client computer to combine them together, the office apparatuses desirably directly communicate with one another along relevant work flows.

If, however, an office apparatus acts as a client computer, the above problem affects the client and server processes in this office apparatus, so the problem among the office apparatuses becomes more complicated than the problem between the client computer and the office apparatuses.

The present invention has been provided to solve these problems. By simply logically connecting a client computer and an office apparatus together for a minimum required amount of time and allowing them to be engaged in a minimum required amount of interactions, this invention can allow a client computer to fully, easily, and expandably control a service provided by an office apparatus. Thus, a first object of this invention is to provide an office apparatus, a network system, and a method for controlling them that provide the above function and that also allow the office apparatus to provide required response information to a client computer and to fully, easily, and expandably control desired services provided by other apparatuses.

A second object of this invention is to provide an office apparatus, a network system, and a method for controlling them wherein by simply logically connecting a client computer and an office apparatus together for a minimum required amount of time and allowing them to engage in a minimum required amount of interactions, a client computer can fully, easily, and expandably control a service provided by an office apparatus and wherein a function provided by a unitary office apparatus is easily combined with functions of other office apparatuses to implement a series of work flows.

BRIEF DESCRIPTION OF THE DRAWINGS

FIG. 9 is an explanatory drawing showing an example of a dialog displayed on the display device of the client computer 3;

FIG. 10 is an explanatory drawing showing an example of a dialog displayed on the display device of the client computer 3;

DETAILED DESCRIPTION OF THE PREFERRED EMBODIMENTS

Embodiments of this invention will be described below with reference to the drawings.

(First Embodiment)

First, a first embodiment of this invention will be explained with reference to FIGS. 1 to 7.

Figure 1:
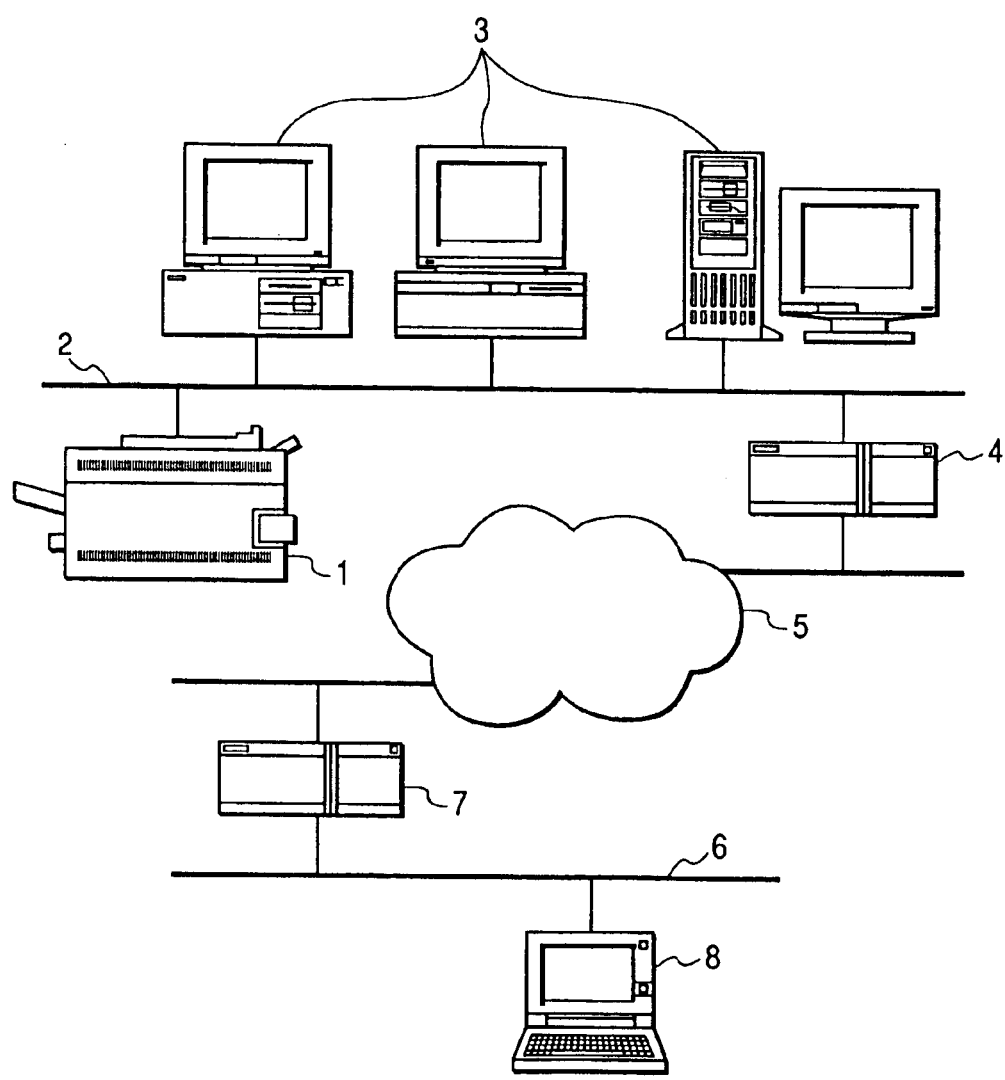
FIG. 1 is an explanatory drawing showing an example of a network configuration of an office system including an image processing apparatus as an office apparatus according to a first embodiment of this invention.

FIG. 1 is an explanatory drawing showing an example of a network configuration of an office system including an image processing apparatus as an office apparatus according to a first embodiment of this invention. In this figure, an image forming apparatus is used as an example of an office apparatus.

In the figure, the office system comprises a first network composed of an image processing apparatus 1, multiple client computers 3, and the router 4 that are connected together via a local area network (hereafter referred to as "LAN") 2 and a second network composed of the router 7 and a remote client 8 connected together via a LAN 6. The first and second networks are connected to a wide area network 5 via the routers 4 and 7.

The LAN 2 implements mutual communication between the image processing apparatus 1 that is an office apparatus and another office apparatus (not illustrated) and the client computers 3. The client computer 3 comprises an input device such as a keyboard or a mouse that is used by a user for input and an output device such as a display that outputs information to a user. The client computer 3 is connected to the LAN 2.

The router 4 has a function of connecting the LAN 2 to another network to implement communication between apparatuses connected to these networks. The wide area network 5 interfaces with private line networks, Internet, and LANs that connect to a large number of networks. The router 7 connects the LAN 6 and the wide area network 5 together to enable the remote client 8 to remote-control the image processing apparatus 1.

Figure 2:
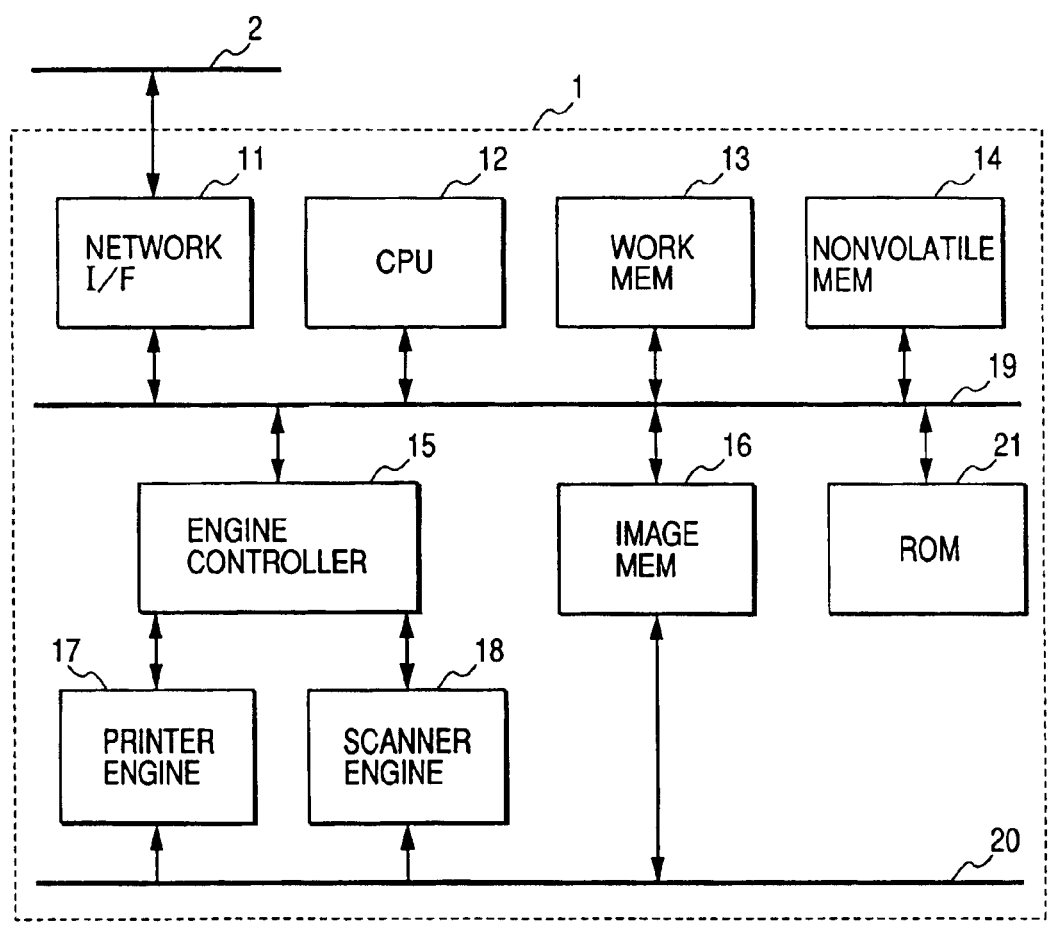
FIG. 2 is a block diagram showing a general configuration of the inside of the image processing apparatus 1 shown in FIG. 1.

FIG. 2 is a block diagram showing a configuration of control inside the image processing apparatus 1. In this figure, the image processing apparatus 1 is mainly composed of a network I/F 11 for transmitting data frames to and from the LAN 2, a CPU 12 consisting of a CPU or an MPU to execute various computations and to control the entire image processing apparatus, a work memory 13 for storing programs executed by the CPU 12 and data associated with the execution, a ROM 21 for storing programs executed by the CPU 12, the initial values of data associated with the execution, and data that must be saved before and after power-off, a non-volatile memory 14 consisting of a flash ROM, NVRAM, or HDD, an engine controller 15 for controlling various image processing engines, an image memory 16 for storing image data, a printer engine 17 that is an image processing engine for forming an image on transfer paper based on image data, and an scanner engine 18 that is an image processing engine for reading an image from a manuscript to form image data.

The network I/F 11, the CPU 12, the work memory 13, the ROM 21, the non-volatile memory 14, the engine controller 15, and the image memory 16 are connected together via a bus 19 to transmit various data such as control information and engine statuses to and from one another via the bus 19.

The printer engine 17 and the scanner engine 18 are connected to and controlled by the engine controller 15. In addition, the printer engine 17, the scanner engine 18, and the image memory 16 are connected to an image bus 20 to transmit image data to and from each other via the image bus 20.

Figure 3:
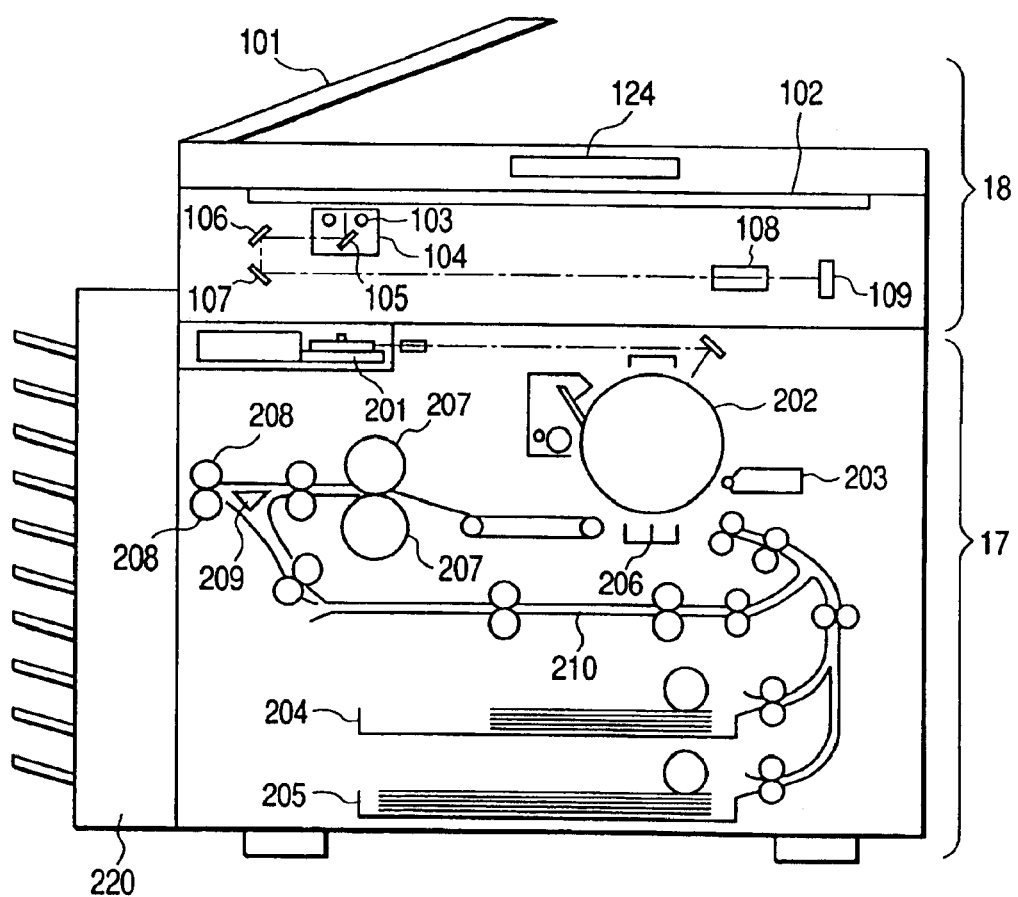
FIG. 3 is a vertical sectional view showing an example of a configuration of the printer engine 17 and scanner engine 18 shown in FIG. 2.

FIG. 3 is a vertical sectional view showing an example of a configuration of the printer engine 17 and scanner engine 1B shown in FIG. 2. In FIG. 3, 101 is a manuscript feeding device for sequentially transferring manuscripts loaded on a manuscript table, onto the surface of a manuscript table glass 102. When a manuscript is transferred onto the manuscript table glass 102, a manuscript illuminating lamp 103 lights and a scanner unit 104 moves to illuminate the manuscript. Reflected light from the manuscript passes through a lens 108 via mirrors 105, 106, and 107 and is then input to a CCD image sensor 109. The manuscript feeding device 101, the manuscript table glass 102, the manuscript illuminating lamp 103, the scanner unit 104, the mirrors 105 to 107, the lens 108, and the CCD image sensor 109 constitute the scanner engine 18. The CCD image sensor 109 photoelectrically transforms the input image into image data and sends it to the printer engine 17.

The image data is input to an exposure control section 201 of the printer engine 17 and is transformed into an optical signal by the exposure control section 201. A photosensitive body 202 is irradiated with this optical signal. A developing machine 203 then develops a latent image formed on the photosensitive body 202 using this irradiation light. Simultaneously with the development, transfer paper is transported from a transfer paper accumulating section 204 or 205, and a transfer section 206 transfers the developed image to this transfer paper. A fixing section 207 fixes the transferred image to the transfer paper, which is then ejected from an ejection section 208 to the exterior of the apparatus. If a sorter 220 is executing a sorting function, the transfer paper output from the ejection section 208 is ejected to each pin, and otherwise it is ejected to the highest pin.

Figure 4:
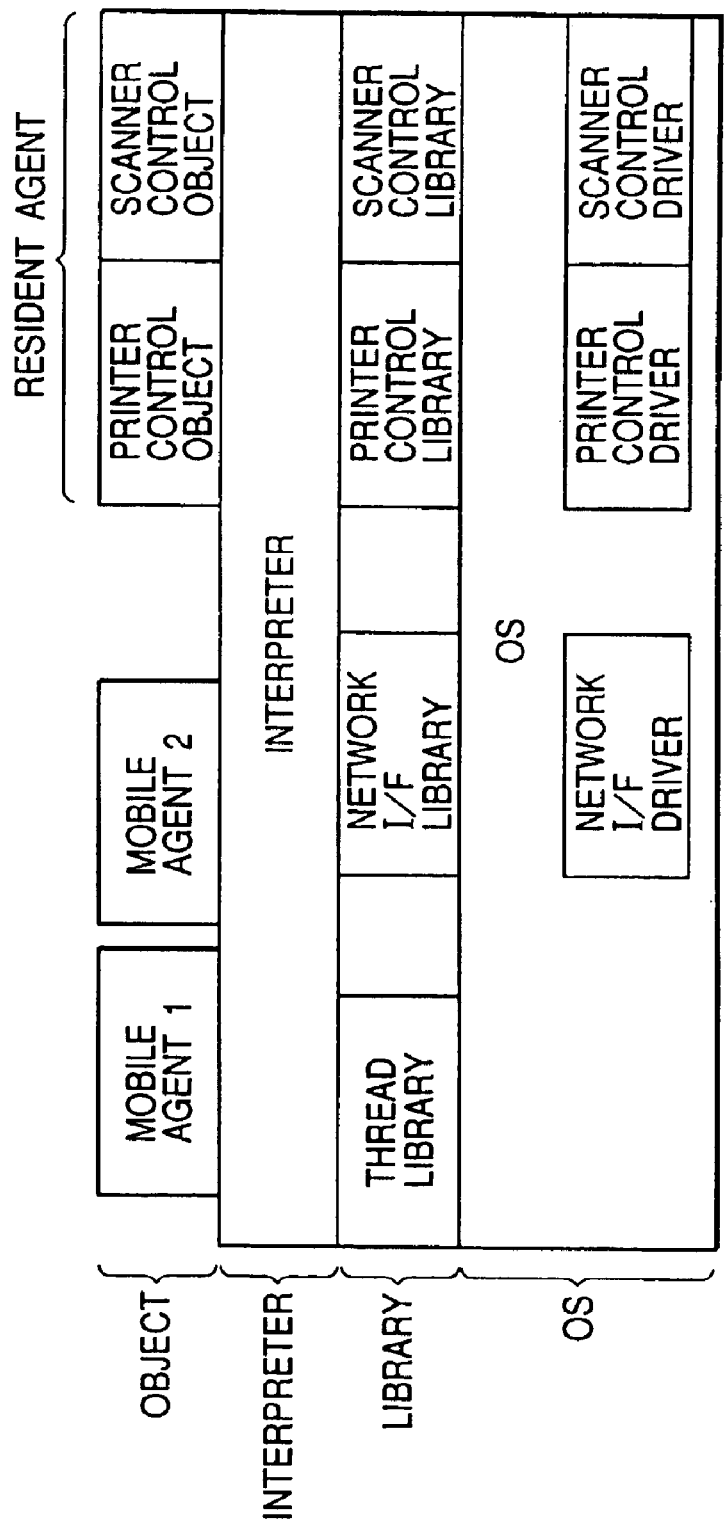
FIG. 4 is a typical hierarchy diagram showing the structure of data stored in the work memory 13 shown in FIG. 2 and also showing the structure of software processing a program code.

FIG. 4 is a typical hierarchy diagram showing the software structure of the image processing apparatus 1. This software is implemented by the CPU 12 processing the data structure and program codes stored in the work memory 13 shown in FIG. 2. If the non-volatile memory 14 is a ROM, program codes may be stored only in the non-volatile memory 14.

In FIG. 4, the software consists of four hierarchies each of which utilizes a service provided by its lower hierarchy.

The lowest layer is an OS, that is, a hierarchy for managing the execution contexts of programs as well as memories. The OS has incorporated therein three device drivers including a network I/F driver, a printer control driver, and a scanner control driver and cooperating with one another.

The network I/F driver is software that controls the network I/F 11. The printer control driver is software that controls the printer engine 17 via the engine controller 15 and the image memory 16. The scanner control driver is software that controls the scanner engine 18 via the engine controller 15 and the image memory 16.

The second lowest layer is various libraries. A thread library provides a thread function to a program using the thread library. A thread is a unit of parallel execution of software. Multiple threads within a single process have different execution contexts (a program counter, a stack, and a register) but shares a memory space. The thread may be called a "light weight process" because thread context switching requires a smaller amount of processing than process context switching.

A network I/F library uses the network I/F driver to implement data transmission via a network.

A printer control library uses the functions of the printer control driver to provide a printer control API (Application Programming I/F).

A scanner control library uses the functions of the scanner control driver to provide a scanner control API.

The third lowest layer is an interpreter. The interpreter provides an object execution environment. An object according to this embodiment is a subset of an object in a widely known object-oriented paradigm. That is, the object is a software structure comprising a set of data (a set of a number of attributes) and processing (a set of a number of operations) associated with a concept within a problem area. Each object exists autonomously and communicates with other objects (image passing) so that the group of objects are executed in parallel to achieve a series of processing.

The interpreter has an object scheduler (not shown) that intermittently provides a processing time of the processor to each object operating on the interpreter. The object scheduler uses the thread library to allow the objects to be virtually executed in parallel.

The interpreter also has an object decoder/encoder. The decoder encodes the script (a command train) and data for the object expanded on the memory in an executable form, into a bit train that can be transferred via the network so that the structure present on the memory can be substantially recovered.

Figure 5:
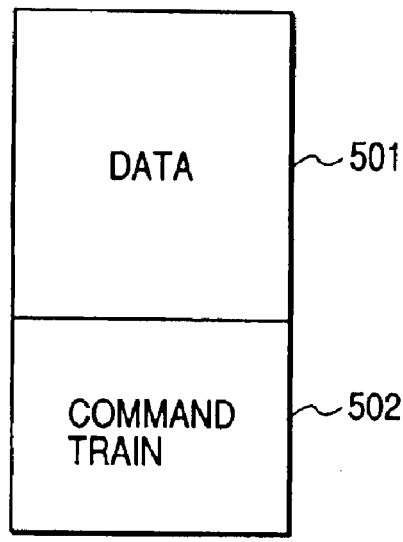
FIG. 5 is a conceptual drawing showing an example of a network packet with an object encoded therein.

FIG. 5 is a conceptual drawing showing an example of a network packet generated by encoding an object. As shown in this figure, a network packet is composed of a portion 501 obtained by encoding all data (a set of attributes) associated with the execution of the object and a command train portion 502 for the object.

Returning to FIG. 4, the highest layer is objects managed and executed on the interpreter.

A printer control object provides other objects with multiple operations performed to control the printer engine 17 via the printer control library, and functions as a representative object for the printer engine 17. That is, if in a command train for an object, a (message passing) command for calling an operation provided by a printer control object is executed, control for this operation is provided to the printer engine 17. Likewise, when an object calls an operation for extracting information from the printer control object, status information on the actual printer engine 17 can be obtained.

A scanner control object provides other objects with multiple operations performed to control the scanner engine 18 via the image scanner control library, and functions as a representative object for the scanner engine 18. That is, if in a command train for an object, a (message passing) command for calling an operation provided by a scanner control object is executed, control for this operation is provided to the scanner engine 18. Likewise, when an object calls an operation for extracting information from the scanner control object, status information on the actual scanner engine 18 can be obtained.

The printer and scanner control objects are particularly called a "resident agent". That is, when the interpreter is activated after the image processing apparatus 1 has been started up, it automatically generates, initializes, and activates the resident agent as its initial processing. The resident agent remains in this apparatus during the operation of the image processing apparatus 1. That is, for the resident agent, an infinite loop is configured inside a LIVE operation, which will be described below.

In FIG. 4, a mobile agent is an object capable of moving from one network node to another. The mobile agent plays the role of an agent for a job (for example, a print job).

In a command train, the mobile agent contains a command train for calling a GO operation. The GO operation means "movement". Upon discovering the GO operation during the interpretation of the command train for a mobile agent, the interpreter uses the object encoder to encode all data and command train associated with the current execution of the mobile agent. The interpreter then transfers a network packet with the mobile agent encoded therein to an interpreter in a node specified by the argument in the GO operation.

The interpreter that has received the transferred network packet uses the object decoder to decode this network packet into the memory space as an executable command train and data, and adds this mobile agent to the schedule targets of the object scheduler.

The transferred and decoded data associated with the execution of the mobile agent contains data (a program counter) indicating the position of the next command to execute for the mobile agent. Thus, the first command of the command train for the mobile agent executed by the interpreter of the destination node is the command next to the one executed by the interpreter of the source node last. In this manner, the mobile agent executes processing described in its command train while moving through network nodes having an execution environment (the interpreter) for the mobile agent.

All objects processed by the interpreter each have an operation defining processing required to initialize this object. When an object is generated, the interpreter first executes a command train defining this initializing operation.

In addition, the mobile and resident agents each have an operation defining a series of processing (hereafter referred to as a "LIVE operation"). Once the initialization of the object has been completed, the interpreter executes a command train defining the LIVE operation. Once the command train defining the LIVE operation has been completed, the interpreter removes the object to release all memory areas used only for this object.

An object can interact with another object by means of message passing. The memory space for the interpreter existing in each node significantly varies among the nodes. Thus, if, in a certain node, one mobile agent is to interact with another agent, the reference (the pointer) to this target object must be obtained beforehand.

This operation is implemented as follows: in the command train for the mobile agent, identification information for specifying the object to interact with is used as an argument to call an interaction request operation (hereafter referred to as a "MEET" operation) that is a built-in operation provided by the interpreter. The identification information for specifying the target object is a unique object identifier or information indicating conditions for the object (for example, the identifier of the class to which the object belongs).

Once the MEET operation has been performed successfully, the mobile agent obtains the reference to the target object and use it to allow an operation to be performed by the target object. That is, interactions are possible by means of message passing. Specifically, in FIG. 4, upon meeting the printer or scanner control object that is the resident agent, a mobile agent 1 or 2 that has moved from another node can access data processed by the target object to call an operation provided by this object.

The client computer 3 sends the mobile agent to the image processing apparatus 1 to control the apparatus 1.

Figure 6:
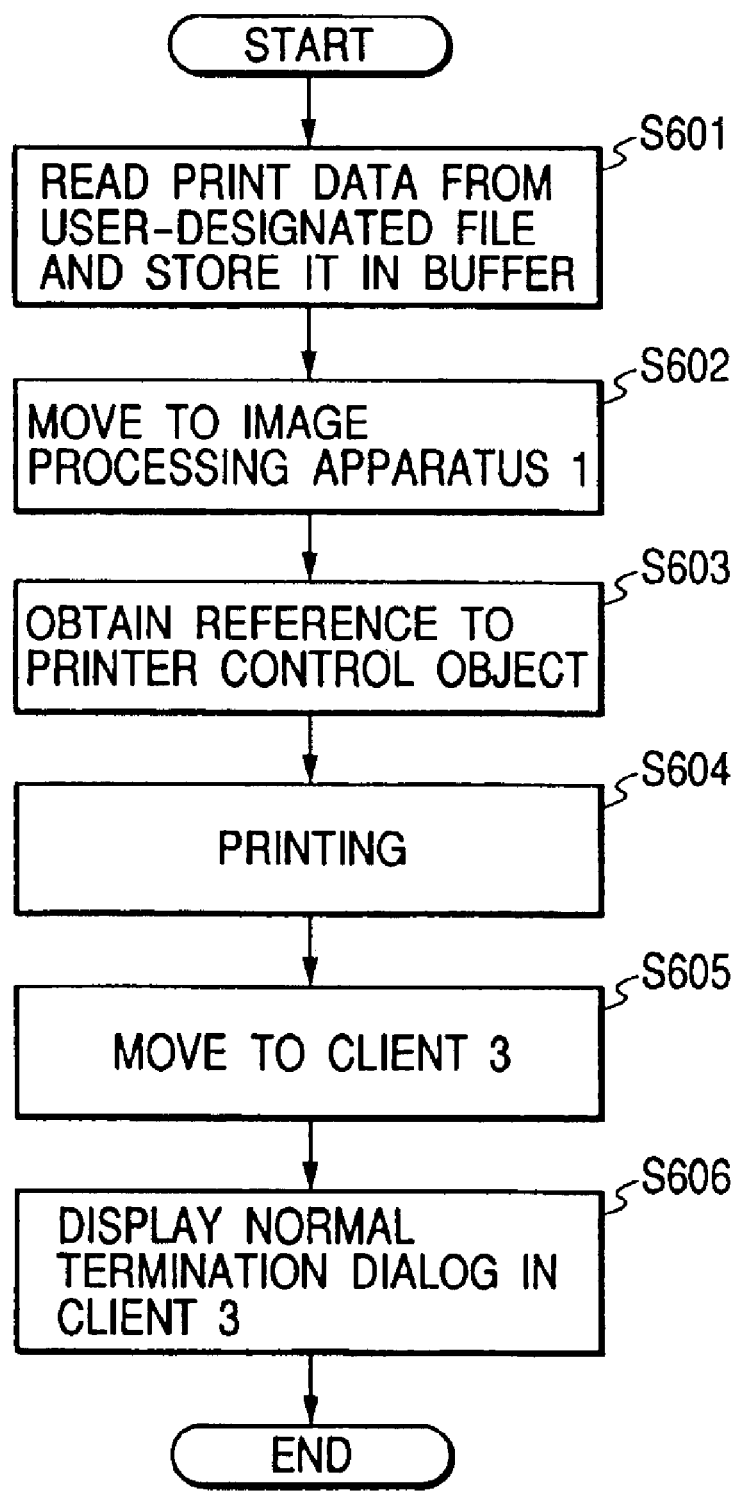
FIG. 6 is a flowchart showing a procedure used by a mobile agent to process a command train for implementing a LIVE operation.

FIG. 6 is a flowchart showing a procedure (a command train) used by a mobile agent to process a LIVE operation if the client computer 3 allows the image processing apparatus 1 to execute printing.

A mobile agent activated by the client computer 3 opens a user specified file (print data) from a local file system for the client computer 3, and stores the file in a buffer that is one of the attributes of this mobile agent (step S601).

Next, the mobile agent uses a GO operation indicating the image processing apparatus 1 as a destination in order to move to the interpreter on the image processing apparatus 1 (step S602). At this point, the interpreter on the client computer 3 marshals all command trains and data (a set of attributes) within the mobile agent to a data stream that can be communicated via a network. The interpreter then sends this data stream to the image processing apparatus 1.

In addition, once the movement of the mobile agent has been completed, the interpreter of the client computer 3 removes this mobile agent from its internal table to release resources such as the memory space that have been used by this mobile agent.

The image processing apparatus 1 expands the received data stream, places the expanded data stream in the memory space managed by the interpreter of the image processing apparatus 1, and registers this mobile agent in a management table as an executable object. The interpreter of the image processing apparatus 1 resumes the execution of the LIVE operation from the position (step S603) indicated by the program counter automatically stored as the data in the mobile agent.

When the execution of the LIVE operation is resumed, the mobile agent requests from the interpreter interactions with the printer control object that is the resident agent in the image processing apparatus 1 and obtains the reference to the printer control object (step S603).

As described above, the printer control object is programmed as an object for controlling the printer engine 17 and obtaining its status. Printer control object is generated and registered by the interpreter upon the start-up of the image processing apparatus 1.

At step S602, the mobile agent uses as an argument the data stored in the buffer in order to call a print request operation provided by the printer control object. As a result, the printer engine 17 prints the data according to the print request operation performed by the printer control object (step S604).

Once the printing has been terminated, the mobile agent uses the GO operation again to move from the interpreter of the image processing apparatus 1 to the interpreter of the client computer 3 (step S605). In this case, the interpreter of the image processing apparatus 1 marshals all command trains and data within the mobile agent object to a data stream that can be communicated via a network. The interpreter then sends this data stream to the client computer 3.

In addition, once the movement of the mobile agent has been completed, the interpreter of the image processing apparatus 1 removes this mobile agent from its internal table to release resources such as the memory space that have been used by this mobile agent.

The client computer 3 expands the received data stream, places the expanded data stream in the memory space managed by the interpreter of the client computer 3, and registers this mobile agent in the management table as an executable object. The interpreter of the client computer 3 resumes the execution of the LIVE operation from the position (step S606) indicated by the current program counter stored as the data in the mobile agent.

When the execution of the LIVE operation is resumed, the mobile agent calls a dialog display operation provided by a graphic library object provided beforehand in the interpreter of the client computer 3 to control the screen display of the client computer. As a result, according to the dialog display operation, a dialog (normal termination dialog) such as that shown in FIG. 7 is displayed on a graphical user interface (GUI) for the display device of the client computer 3.

Figure 7:
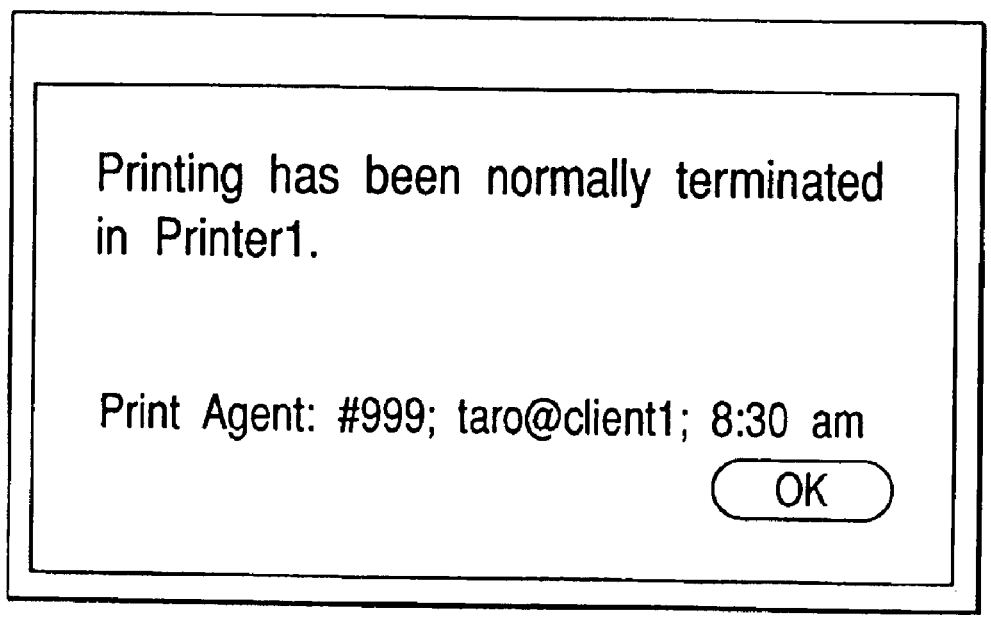
FIG. 7 is an explanatory drawing showing an example of a dialog displayed on a display device of a client computer 3.

FIG. 7 is an explanatory drawing showing an example of a dialog displayed on the display device of the client computer 3. As shown in this figure, the display screen of the client computer 3 shows that the printing in the image processing apparatus 1 (Printer 1) has been completed and also displays identification information for the mobile agent (#999), identification information for the user who has activated the mobile agent (taro), identification information for the client computer 3 in which the mobile agent has been activated (client 1), and the time at which the mobile agent was activated (8:30 am).

During the execution of the mobile agent, the interpreter automatically stores the above information associated with the execution of the object, in the mobile agent as its attribute values. Step S606 can combine these attribute values together to display various information.

If in this dialog, the "OK" button in the display screen is pressed, the LIVE operation is terminated. The interpreter removes this mobile agent object from its internal table to release resources such as the memory space that have been used by this object.

As described above, according to this embodiment, after sending the image processing apparatus 1 print data and a mobile agent that processes this data for client computer, the client computer 3 can very easily receive the normal termination dialog after the completion of printing without the need to maintain continuous interactive processing with the image processing apparatus 1. That is, by logically connecting the client computer 3 and the image processing apparatus 1 together for a minimum required amount of time and allowing them to engage in a minimum required amount of interactions, the client computer 3 can fully, easily, and expandably control the functions of the image processing apparatus 1 and can control information transmissions from the image processing apparatus 1 to the client computer 3 such as the normal termination dialog.

In addition, a spool (in particular, a print queue used for the print server during printing) of an application server for spooling transferred data is interposed between the client computer 3 and the image processing apparatus 1. Thus, even if it is essentially difficult to directly control the image processing apparatus 1 using an interactive protocol, the above complicated control of the image processing apparatus 1 can be implemented without the needs for high costs.

In addition, after receiving the mobile agent, the image processing apparatus 1 can dedicate itself to its original image processing operation without the need to maintain continuous interactive processing. Cost increases can also be controlled because the image processing apparatus 1 must only deliver the sophisticated dialog to the client computer 3 after the completion of the image processing operation.

In addition, this embodiment does not require polling that repeats interactive processing during the execution of printing, the network traffic used for control can be controlled. Accordingly, even if the remote client 8 controls the image processing apparatus 1 using not only the LAN2 but also a network such as the wide area network 5 or Internet that has a relatively small bandwidth, the image processing apparatus 1 can be fully and easily controlled.

Furthermore, during the operation of the image processing apparatus 1, this embodiment fully functions with intermittent connections instead of continuous connections, the above effects can be obtained even if the remote client 8 has a dial-up network connection.

Furthermore, by simply describing a series of desired processing as a LIVE operation, the user can easily program a series of distributed processing distributed between the client computer 3 and the image processing apparatus 1. This embodiment can thus improve development efficiency and reliability. Consequently, compared to the prior art, version ups can be easily carried out to solve the problems associated with expandability. As a result, the development costs of the image processing apparatus 1 and entire system are reduced to enable the costs of the image processing apparatus 1 and system to be reduced.

Although this embodiment has been described using the image processing apparatus as an example of an office apparatus, this invention is not limited to this aspect but is applicable to office apparatuses that can deal with digital data, for example, copiers, facsimile terminal equipment, image scanners, and telephones.

(Second Embodiment)

Next, a second embodiment of this invention will be described with reference to FIGS. 8 to 10. The second embodiment can be implemented in the office system described in the first embodiment and consisting of the configuration shown in FIGS. 1 to 5.

Figure 8:
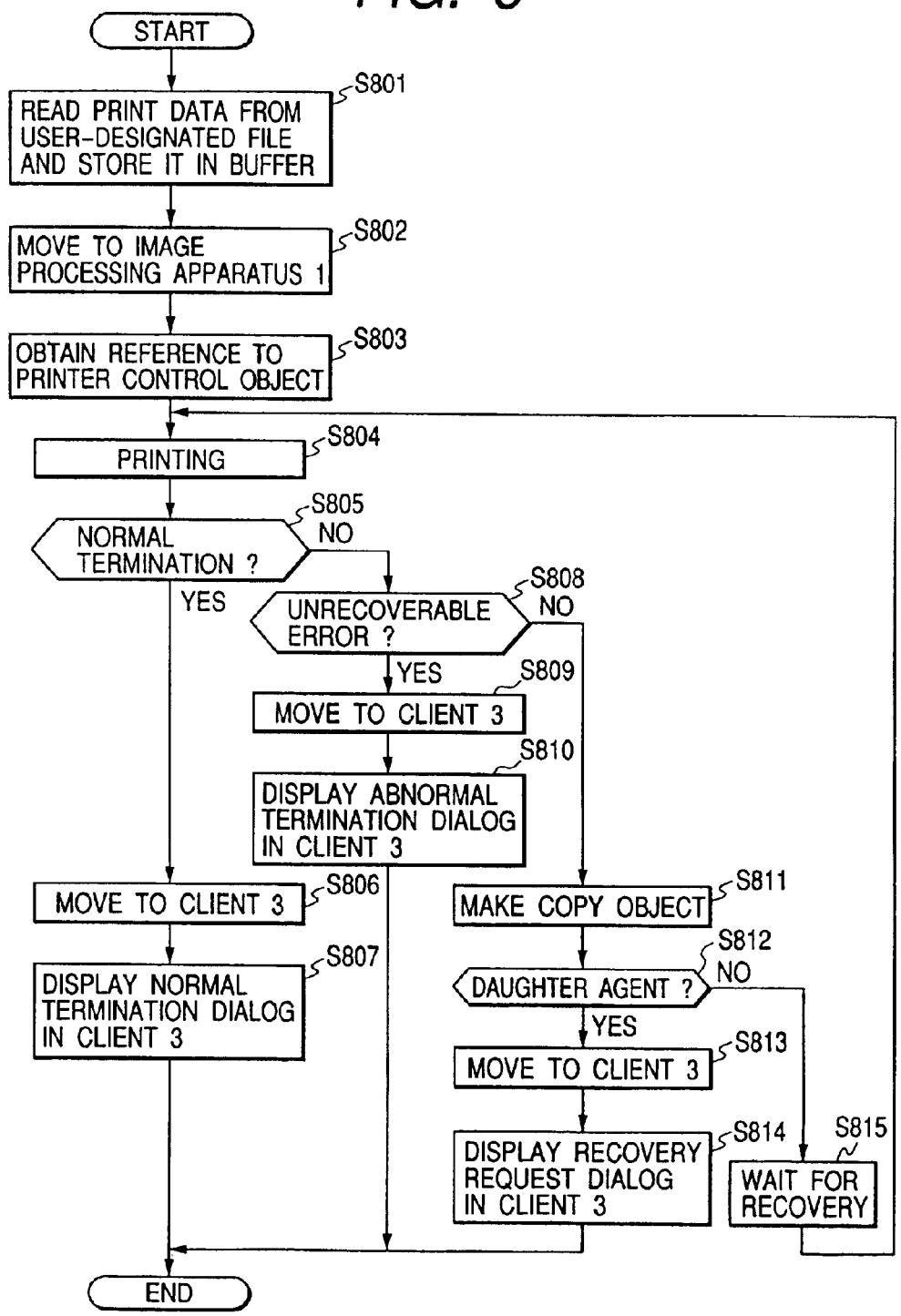
FIG. 8 is a flowchart showing a procedure used by a mobile agent to process a command train for implementing a LIVE operation, the procedure being executed in an office system including an image processing apparatus as an office apparatus according to a second embodiment of this invention.

FIG. 8 is a flowchart showing an example of a procedure used by a mobile agent to process a LIVE operation (command train) if the client computer 3 allows the image processing apparatus 1 to execute printing in an office system according to the second embodiment.

In FIG. 8, the processing procedure between steps S801 and S803 is similar to the processing procedure between steps S601 and S603 shown in FIG. 6 for the first embodiment.

As step S803, the mobile agent obtains the reference to the print control object from the interpreter of the image processing apparatus 1, and at step S802, uses as an argument the data stored in the buffer in order to call the print request operation provided by the print control object. As a result, according to the print request operation of the printer control object, the printer engine 17 prints the data (step S804).

Once the printing has been terminated, the control returns from the calling of the print request operation, and the mobile agent obtains the result status of the printing as an operation return value. The result status obtained is stored as an attribute of the mobile agent.

The mobile agent then determines whether the printing result status obtained indicates a normal termination (step S805). If so, the mobile agent uses a GO operation to move from the image processing apparatus 1 to the client computer 3 (step S806). In this case, the interpreter of the image processing apparatus 1 marshals all command trains and data within the mobile agent object to a data stream that can be communicated via a network. The interpreter then transfers this data stream to the client computer 3.

The marshaled data contains all the attributes of the mobile agent unless otherwise specified in the command train. Thus, the information on the printing result status obtained from the image processing apparatus 1 is also contained in the marshaled data.

Once the movement of the mobile agent has been completed, the interpreter of the image processing apparatus 1 removes this mobile agent from its internal table to release resources such as the memory space that have been used by this mobile agent.

The client computer 3 expands the received data stream, places the expanded data stream in the memory space managed by the interpreter inside the client computer 3, and registers this mobile agent in the management table as an executable object.

The interpreter of the client computer 3 resumes the execution of the LIVE operation from the position (step S807) indicated by the current program counter stored as the data in the registered mobile agent.

When the execution of the LIVE operation is resumed, the mobile agent calls the dialog display operation provided by the graphic library object provided beforehand in the interpreter of the client computer 3 to control the screen display of the client computer. As a result, according to the dialog display operation, a dialog such as that shown in FIG. 7 is displayed on the graphical user interface (GUI) for the display device of the client computer 3 (step S807).

If in this dialog, the "OK" button in the display screen is pressed, the LIVE operation is terminated. The interpreter removes this mobile agent object from its internal table to release resources such as the memory space that have been used by this object.

On the other hand, if step S805 determines that the operation has not been terminated normally, the mobile agent determines based on the printing result status whether the printing has been terminated with an unrecoverable error (step S808).

If step S808 determines that the printing has been terminated with an unrecoverable error, for example, due to a failure in the apparatus, a GO operation is used to move the mobile agent from the interpreter of the image processing apparatus 1 to the client computer 3 (step S809). In this case, the interpreter of the image processing apparatus 1 marshals all command trains and data within the mobile agent object to a data stream that can be communicated via a network. The interpreter then transfers this data stream to the client computer 3.

The marshaled data contains all the attributes of the mobile agent unless otherwise specified in the command train. Thus, the information on the printing result status obtained from the image processing apparatus 1 is also contained in the marshaled data.

Once the movement of the mobile agent has been completed, the interpreter of the image processing apparatus 1 removes this mobile agent from its internal table to release resources such as the memory space that have been used by this mobile agent.

The client computer 3 expands the received data stream, places the expanded data stream in the memory space managed by the interpreter inside the client 3, and registers this mobile agent in the management table as an executable object. The interpreter of the client computer 3 resumes the execution of the LIVE operation from the position (step S810) indicated by the current program counter stored as the data inside the registered mobile agent.

When the execution of the LIVE operation is resumed, the mobile agent calls the dialog display operation provided by the graphic library object provided beforehand in the interpreter of the client computer 3 to control the screen display of the client computer.

As a result, according to the dialog display operation, an abnormal termination dialog such as that shown in FIG. 9 is displayed on the graphical user interface (GUI) for the display device of the client computer 3 (step S810).

FIG. 9 is an explanatory drawing showing an example of an abnormal termination dialog displayed on the display screen by the mobile agent. As shown in this figure, the display screen of the client computer 3 shows that in the image processing apparatus 1 (Printer 1), printing has been terminated abnormally with an unrecoverable error, and also displays identification information for the mobile agent (#999), identification information for the user who has activated the mobile agent (taro), identification information for the client computer 3 in which the mobile agent has been activated (client 1), and the time at which the mobile agent was activated (8:30 am).

Some of the above information associated with the execution of the object is automatically stored by the interpreter in the mobile agent as its attribute values during its execution, and others comprise command trains in the LIVE operation explicitly stored as attribute values.

At step S810, these attribute values can be combined together to display various information. For example, the result status of the printing can include the detailed contents of the error to configure the dialog so as to specifically display these contents.

If in this dialog, the "OK" button in the display screen is pressed, the LIVE operation is terminated. Then, the interpreter removes this mobile agent object from its internal table to release resources such as the memory space that have been used by this object.

In addition, step S808 determines that the printing has been terminated abnormally with other than unrecoverable errors, for example, with a recoverable error such as paper jam, the process proceeds to step S811.

Then, in the case of termination with an unrecoverable error, the mobile operation calls a FORK operation that is a built-in operation to generate a duplicate object (a daughter agent) having the same data and command trains as this mobile agent (step S 811).

Prior to the execution of the FORK operation, the two objects including the original and the copy have identical statuses for the program counter and the stack except for the return value of the FORK operation. Thus, this value enables the object to be identified as the original or the copy, that is, the daughter agent.

The return value of the FORK operation is used to determine whether the object is the original or the daughter agent (step S812), and if it is the daughter agent, it moves from the image processing apparatus 1 to the interpreter of the client computer 3 (step S813).

In this case, the interpreter of the image processing apparatus 1 marshals all command trains and data within the daughter agent to a data stream that can be communicated via a network. The interpreter then transfers this data stream to the client computer 3.

The marshaled data contains all the attributes of the daughter agent unless otherwise specified in the command train. Thus, the information on the printing result status obtained from the image processing apparatus 1 is also contained in the marshaled data.

Once the movement of the daughter agent has been completed, the interpreter of the image processing apparatus 1 removes this daughter agent from its internal table to release resources such as the memory space that have been used by this mobile agent.

The client computer 3 expands the received data stream, places the expanded data stream in the memory space managed by the interpreter of the client computer 3, and registers this daughter agent in the management table as an executable object. The interpreter of the client computer 3 resumes the execution of the LIVE operation from the position (step S814) indicated by the current program counter stored as the data inside the registered daughter agent.

When the execution of the LIVE operation is resumed, the daughter agent calls the dialog display operation provided by the graphic library object provided beforehand in the interpreter of the client computer 3 to control the screen display of the client computer. As a result, according to the dialog display operation, a recovery request display dialog such as that shown in FIG. 10 is displayed on the graphical user interface (GUI) for the display device of the client computer 3 (step S814).

FIG. 10 is an explanatory drawing showing an example of a dialog displayed on the display screen by the mobile agent (a daughter agent). As shown in this figure, the display screen of the client computer 3 shows that printing in the image processing apparatus 1 (Printer 1) has been aborted with a recoverable error, and also displays the detailed cause of the error (no paper), an instruction for recovery from the error (Supply paper), identification information for the mobile agent (#999), identification information for the user who has activated the mobile agent (taro), identification information for the client computer 3 in which the mobile agent has been activated (client 1), and the time at which the mobile agent was activated (8:30 am).

Some of the above information associated with the execution of the object is automatically stored by the interpreter in the daughter agent as its attribute values during its execution, and others comprise command trains in the LIVE operation explicitly stored in the daughter agent as attribute values.

At step S814, these attribute values can be combined together to display various information. For example, the result status of the printing can include the detailed contents of the error to configure the dialog so as to display these contents.

If in this display state, the "OK" button in the display screen is pressed, the LIVE operation is terminated. Then, the interpreter removes this daughter agent object from its internal table to release resources such as the memory space that have been used by this object.

In addition, if step S812 determines that the mobile agent is not the daughter agent but the original agent, the mobile agent calls an operation of the printer control object to request it to notice an error recovery event and then enters a paper feed state while waiting for the error recovery (step S815).

The executes recovery processing according to the display in step S814, and once the image processing apparatus has recovered from the error status, the mobile agent receives an event dialog from the print control object. According to this dialog, the original mobile agent resumes the printing in step S804.

As described above, this embodiment can provide effects similar to those of the first embodiment by simply logically connecting the client computer and the image processing apparatus together for a minimum required amount of time and allowing them to engage in a minimum required amount of interactions. Furthermore, the image processing apparatus 1 can send the client computer 3 sophisticated dialogs such as the operational status of the image processing apparatus 1 (normal termination, unrecoverable abnormal termination, recoverable abnormal termination).

(Third Embodiment)

Next, a third embodiment of this invention will be described with reference to FIGS. 11 to 13.

Figure 11:
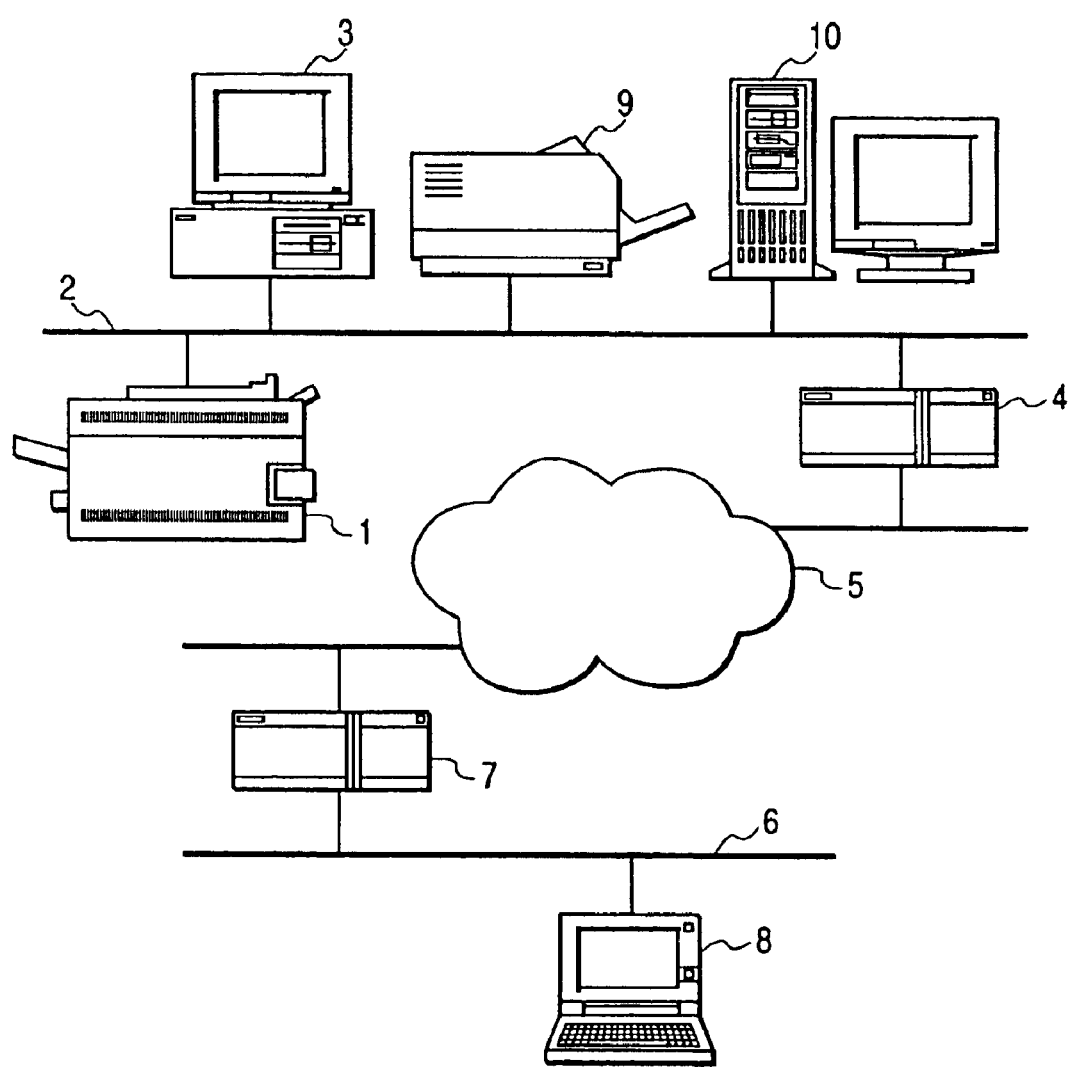
FIG. 11 is a network diagram showing an example of a configuration of an office system including an image processing apparatus as an office apparatus according to a third embodiment of this invention.

FIG. 11 is a network diagram showing a configuration of an office system including an office apparatus according to this embodiment. In this embodiment, an example of an office apparatus is an image processing apparatus. This figure differs from the configuration in FIG. 1 in that in the first network, the image processing apparatus 1 (a first printer), the client computer 3, an image processing apparatus 9 (a second printer), an image filing device 10, and the router 4 are connected to the local area network (hereafter referred to as the "LAN") 2. The other configuration is the same as in FIG. 1. In the following description, the same elements as in FIG. 1 have the same reference numerals.

The image filing device 10 receives image data and saves it to an external storage of a large capacity. In addition, the image processing apparatus 9 has a configuration similar to that of the image processing apparatus 1.

Figure 12:
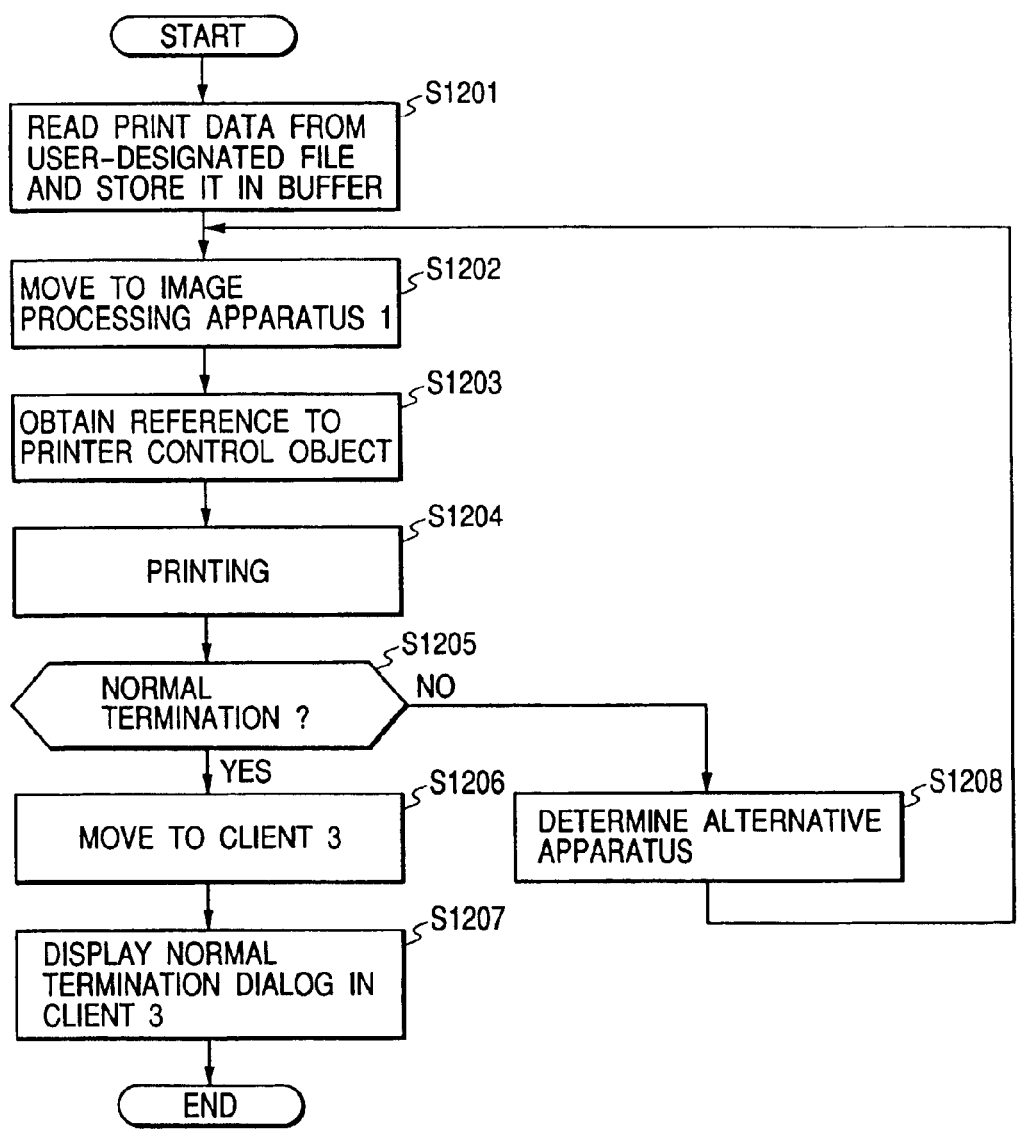
FIG. 12 is a flowchart showing a procedure used by a mobile agent to process a command train for implementing a LIVE operation.

FIG. 12 is a flowchart showing a procedure (a command train) used by a mobile agent to process a LIVE operation in the office system shown in FIG. 11 according to the third embodiment.

A mobile agent activated by the client computer 3 opens a user specified file (print data) from the local file system for the client computer 3, and stores the file in a buffer that is one of the attributes of this mobile agent (step S1201). At this point, the mobile agent stores information such as the name (Printer 1) and address of the image processing apparatus 1 as attributes representing the processing printer.

The processing procedure between steps S1202 and S1207 is similar to the processing procedure between steps S802 and S807 shown in FIG. 8 for the second embodiment.

If step S1205 determines that the result of the printing does not indicate normal termination, that is, determines that the printing could be completed due to, for example, a failure in the apparatus, then an apparatus candidate to be used next is selected from a list of alternative apparatuses that is stored beforehand as an attribute of the mobile agent.

Then, the selected apparatus is defined as the next destination of the mobile agent and is removed from the list of alternative apparatuses (step S1208). According to this embodiment, the image processing apparatus 9 is provided as an alternative apparatus. Thus, the image processing apparatus 9 (Printer 2) is selected, and the information such as the name and address of the image processing apparatus 9 is stored as attributes representing the printer to execute printing. Then, returning to step S1202, the mobile agent moves to the selected alternative apparatus, which then continues and completes the printing.

Figure 13:
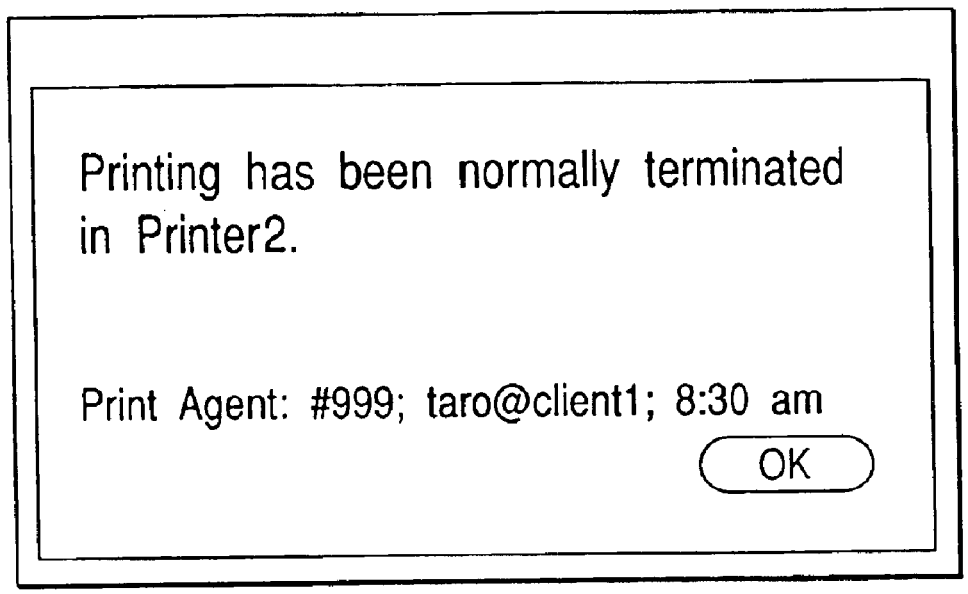
FIG. 13 is an explanatory drawing showing an example of a dialog displayed on the display device of the client computer 3.

If the image processing apparatus 1 or the image processing apparatus 9 that is an alternative apparatus has completed the printing normally, a dialog such as that shown in FIG. 13 is displayed at step S1207.

Viewing the dialog display in FIG. 13, the user knows whether the printing has been carried out in the image processing apparatus 1 or 9.

As described above, this embodiment has the effect of implementing combinatory processing wherein the client computer 3 sets multiple alternative apparatuses in the attributes and command trains for the mobile agent beforehand so that after the mobile agent has been sent to the image processing apparatus 1 and if the apparatus 1 fails to execute printing, the apparatus 1 is switched to an alternative apparatus (in this embodiment, the image processing apparatus 9) included in the list of alternative apparatuses to complete the printing without the need to maintain continuous interactive processing between the client computer 3 and the image processing apparatus 1.

That is, by simply logically connecting the client computer 3 and the image processing apparatus 1 or the image processing apparatus 1 and another apparatus (the image processing apparatus 9) together for a minimum required amount of time and allowing them to engage in a minimum required amount of interactions, the client computer 3 can fully and flexibly control work flow services using a combination of multiple apparatuses.

(Fourth Embodiment)

Next, a fourth embodiment of this invention will be described with reference to FIGS. 14 and 15. The fourth embodiment can be implemented in the office system described in the third embodiment and consisting of the configuration shown in FIG. 11.

Figure 14:
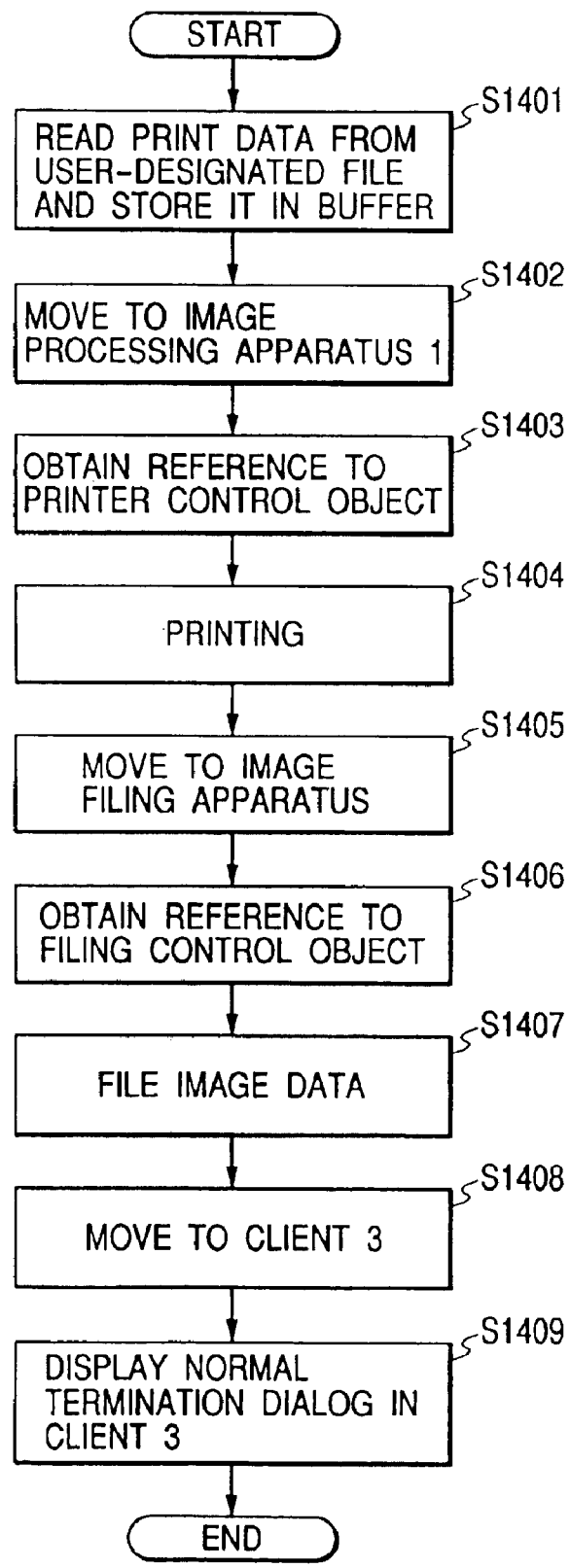
FIG. 14 is a flowchart showing a procedure used by a mobile agent to process a command train for implementing a LIVE operation, the procedure being executed in an office system including an image processing apparatus as an office apparatus according to a fourth embodiment of this invention.

FIG. 14 is a flowchart showing an example of a procedure for processing a LIVE operation which is executed by a mobile agent sent by the client computer 3. In FIG. 14, the processing procedure between steps S1401 and S1404 is similar to the processing procedure between steps S1201 and S1204 shown in FIG. 12 for the third embodiment.

When the printing is terminated at step S1404, the control returns from the calling of the print request operation. The mobile agent obtains as the return value of the print request operation, bit map data on an image expanded through the printing.

The mobile agent stores as an attribute value the bit map data on the developed image obtained from the printer control object. With this data remaining stored, the mobile agent uses a GO operation indicating the image filing device 10 as a destination in order to move to this apparatus 10 (step S1405).

In this case, the interpreter of the image processing apparatus 1 marshals all command trains and data within the mobile agent to a data stream that can w be communicated via a network. The interpreter then transfers this data stream to the image filing device 10. The marshaled data contains all the attributes of the mobile agent unless otherwise specified in the command train. Thus, the expanded image data obtained from the image processing apparatus 1 at step S1404 is also contained in the marshaled data.

Once the movement of the mobile agent has been completed, the interpreter of the image processing apparatus 1 removes this mobile agent from its internal table to release resources such as the memory space that have been used by this mobile agent.

The image filing device 10 expands the received data stream, places the expanded data stream in the memory space managed by the interpreter of the image filing device 10, and registers this mobile agent in a management table as an executable object.

The interpreter of the image filing device 10 resumes the execution of the LIVE operation from the position (step S1406) indicated by the current program counter stored as the data inside the registered mobile agent.

The mobile agent, which has moved to the interpreter of the image filing device 10, requests from the interpreter, interactions with a filing control object resident on the interpreter, and obtains the reference to the filing control object from the interpreter (step S1406).

The filing control object is programmed as an object for controlling a file system for the image filing device 10 and obtaining the status of the device 10, and is generated in the interpreter during its initialization upon the start-up of the image filing device 10.

Then, using as an argument the expanded image data and file name stored at step S1405 as an attribute value, the image filing device calls a filing request operation provided by the filing control object. As a result, according to the filing request operation of the filing control object, the image filing device 10 files this image data (step S1407). Once the filing has been terminated, the control returns from the calling of the filing request operation.

The mobile agent uses the GO operation again to move from the image filing device 10 to the client computer 3 (step S1408). In this case, the interpreter of the image filing device 10 marshals all command trains and data within the mobile agent to a data stream that can be communicated via a network. The interpreter then transfers this data stream to the client computer 3.

The marshaled data contains all the attributes of the mobile agent unless otherwise specified in the command train. Thus, the information on the printing result status obtained from the image filing device 10 is also contained in the marshaled data.

Once the movement of the mobile agent has been completed, the interpreter of the image filing device 10 removes this mobile agent from its internal table to release resources such as the memory space that have been used by this mobile agent.

The client computer 3 expands the data stream, places the expanded data stream in the memory space managed by the interpreter of the client computer 3, and registers this mobile agent in the management table as an executable object. The interpreter of the client computer 3 resumes the execution of the LIVE operation from the position (step S1409) indicated by the current program counter stored as the data inside the registered mobile agent.

Then, the mobile agent calls the dialog display operation provided by the graphic library object provided beforehand in the interpreter of the client computer 3 to control the screen display of the client computer. As a result, according to the dialog display operation, a dialog such as that shown in FIG. 15 is displayed on the graphical user interface (GUI) for the display device of the client computer 3 (step S1409).

Figure 15:
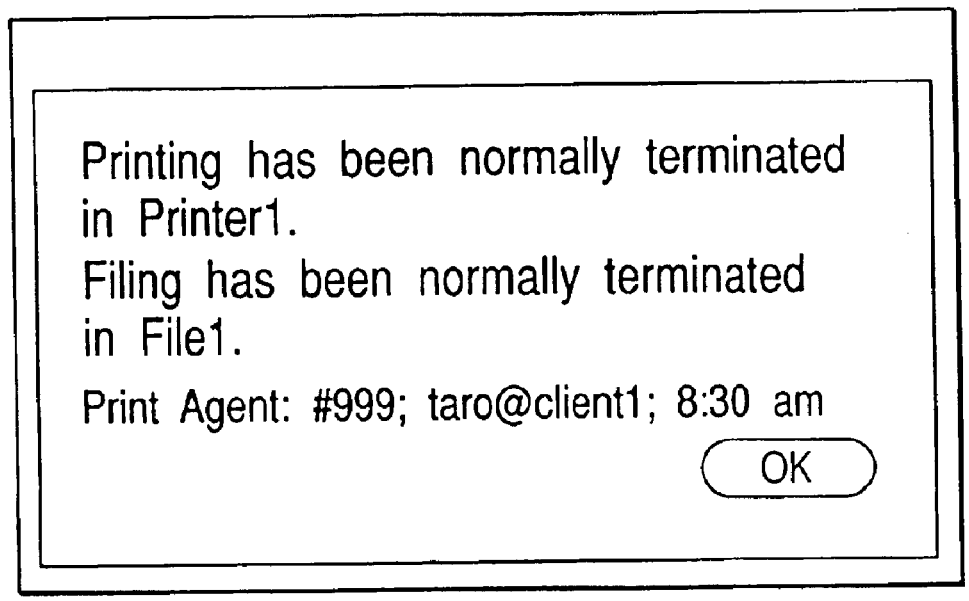
FIG. 15 is an explanatory drawing showing an example of a dialog displayed on the display device of the client computer 3.

FIG. 15 shows an example of a dialog displayed by an mobile agent. As shown in this figure, the display screen of the client computer 3 shows that the printing in the image processing apparatus 1 (Printer 1) has been completed and that image saving has been terminated in the image filing device 10 (File 1), and also displays identification information for the mobile agent (#999), identification information for the user who has activated the mobile agent (taro), identification information for the client computer 3 in which the mobile agent has been activated (client 1), and the time at which the mobile agent was activated (8:30 am).

With respect to the information concerning the execution of these objects, one information is automatically registered as an attribute value of agent during the execution of the mobile agent by the interpreter, and the other information is plainly registered the mobile agent by the order sequence of LIVE operation.

In such a display state, when "OK" button in the display screen is pushed, as the LIVE operation is finished, the interpreter removes this mobile agent from its inner table to release resources such as the memory space that have been used by this mobile agent.

As described above, this embodiment has not only effects similar to those of the first to third embodiments but also the effect of implementing work flows by using command trains for mobile agents to describe a series of work flows that use a combination of multiple office apparatuses (the image processing apparatus 1, the image filing device 10). For example, a work flow can be implemented wherein after a mobile agent executing processing for multiple office apparatuses (group) that carry out different types of processings has been sent to those office apparatuses, an image can be filed in the image filing device after the completion of printing without the need to maintain continuous interactive processing with these apparatuses.

Although this embodiment uses a single mobile agent to sequentially execute multiple processings as in the filing of an image after the termination of printing, an object instance of the mobile agent may be duplicated in its command train so that the duplicate mobile agents carry out multiple processings in parallel.

(Fifth Embodiment)

Of course, the object this invention is achieved by supplying a system or each apparatus constituting the system with a memory medium on which software program codes for implementing the functions of the above embodiments are recorded so that a CPU built into the apparatus reads and executes the program codes stored in the memory medium. In this case, the program codes read out from the memory medium implement this invention, and the memory medium storing the program codes constitutes this invention.

Recording media used to supply program codes include, for example, floppy discs, hard discs, optical discs, CD-ROMs, CD-Rs, magnetic tapes, non-volatile memory cards, and ROMs 6.

In addition, of course, the functions of the above embodiments are not only implemented by allowing the computer to read and execute the program codes, but based on the instructions in the program codes, an OS running on the computer may carry out all or part of the actual processing to implement the functions of the above embodiments.

Furthermore, of course, the program codes read out from the memory medium are written to a memory provided in an extension board inserted into the computer or an extension unit connected thereto, and then based on the instructions in the program codes, a CPU provided in the extension board or unit may carry out all or part of the actual processing to implement the functions of the above embodiments.

What is claimed is:

1. An image processing apparatus which can be connected to an external apparatus via a network, said image processing apparatus comprising:

reception control means for controlling a reception process of receiving agent information including a command train in which a work flow is programmed describing a series of processes to be executed in a plurality of image processing apparatuses, wherein the work flow further describes a first image process to be executed in said image processing apparatus and a second image process to be executed in an external image processing apparatus which is different in mechanism from said image processing apparatus, and wherein the work flow can be programmed such that the second image process is executed after execution of the first image process;

control means for controlling an image processing mechanism of said image processing apparatus by executing, based on the command train included in the received agent information, a control program that controls the image processing mechanism;

memory management means for managing a memory area for executing the command train included in the received agent information;

transmission control means for controlling, responsive to said control means terminating execution of the control program based on the command train, a transmission process of transmitting a process end notice to the external apparatus; and obtainment means for obtaining a reply to the process end notice from the external apparatus, wherein said memory management means releases the memory area for executing the command train included in the received agent information in response to said obtainment means obtaining the reply from the external apparatus.

2. An image processing apparatus according to claim 1, wherein, said control means controls the image processing mechanism to execute a print process, said transmission control means controls, responsive to the image processing mechanism terminating execution of the print process, a transmission process of transmitting a print end notice to the external apparatus so as to cause the display unit of the external apparatus to display a print end confirmation window, and said obtainment means obtains the reply sent from the external apparatus in response to a user of the external apparatus entering a print end confirmation.

3. An image processing apparatus according to claim 1, further comprising an execution means for executing the command train to determine whether a result of processing by the image processing mechanism is an unrecoverable error, and if the result of processing is an unrecoverable error, writing the occurrence of the unrecoverable error to a memory area which is dynamically reserved for the agent information as a data field.

4. An image processing apparatus which can be connected to a network comprising:

reception control means for controlling a reception process of receiving agent information including a command train in which a work flow is programmed describing a series of processes to be executed in a plurality of image processing apparatuses, wherein the work flow further describes a first image process to be executed in said image processing apparatus and a second image process to be executed in an external image processing apparatus which is different in function from said image processing apparatus, and wherein the work flow can be programmed such that the second image process is executed after execution of the first image process;

control means for controlling an image processing mechanism of said image processing apparatus by executing, based on the command train included in the received agent information, a control program that controls the image processing mechanism;

execution means for executing one of the series of processes described in the work flow to be executed in said image processing apparatus; and transmission control means for controlling, responsive to said execution means terminating execution of the one process, a transmission process of automatically transmitting the agent information from said image processing apparatus to the external image processing apparatus so as to cause the external image processing apparatus to execute the command train based on the work flow.

5. An image processing apparatus according to claim 4, wherein said image processing apparatus is a print apparatus and the external image processing apparatus is a filing apparatus.

6. An image processing apparatus according to claim 4, wherein said image processing apparatus is a printer, and wherein the work flow is programmed such that the printer executes a print process and then transmits image data for printing to the external image processing apparatus and such that the external image processing apparatus stores the image data.

7. An image processing apparatus according to claim 4, wherein said transmission control means controls the transmission process to copy the agent information in whole or in part and distributes the copied agent information to at least one external image processing apparatus such that the series of processes described in the work flow may be executed in parallel.

8. An image processing apparatus according to claim 4, wherein the agent information controls in the external image processing apparatus a process of voluntarily releasing a memory area reserved for the agent information while retaining the image data for printing processed by the agent information.

9. An image processing apparatus according to claim 4, wherein the image processing mechanism includes at least one of an image filing mechanism, a scanner mechanism and a printer mechanism.

10. A network system including an image processing apparatus and an external apparatus, said system comprising:
   input means for inputting agent information including a command train in which a work flow is programmed describing a series of processes to be executed in a plurality of image processing apparatuses, wherein the work flow further describes a first image process to be executed in said image processing apparatus and a second image process to be executed in an external image processing apparatus which is different in mechanism from said image processing apparatus, and wherein the work flow can be programmed such that the second image process is executed after execution of the first image process;
   control means for controlling an image processing mechanism of said image processing apparatus by executing, based on the command train included in the agent information input by said input means, a control program that controls the image processing mechanism;
   memory management means for managing a memory area for executing the command train included in the input agent information;
   transmission control means for controlling, responsive to said control means terminating execution of the control program based on the command train, a transmission process of transmitting a process end notice to said external apparatus;
   display control means for controlling a display process of displaying a process end confirmation window on a display unit of said external apparatus in response to the process end notice transmitted by said transmission control means;
   response means for sending a reply to the transmitted process end notice from said external apparatus to said image processing apparatus; and
   obtainment means for obtaining the reply sent by said response means,
   wherein said memory management means releases the memory area for executing the command train included in the received agent response to said obtainment means obtaining the reply from said external apparatus.

11. A system including a plurality of image processing apparatuses which can be connected to a network, each image processing apparatus comprising:
   reception control means for controlling a reception process of receiving agent information including a command train in which a work flow is programmed describing a series of processes to be executed in said plurality of image processing apparatuses, wherein the work flow further describes a first image process to be executed in said image processing apparatus and a second image process to be executed in an another of said plurality of image processing apparatuses which is different in function from said image processing apparatus, and wherein the work flow can be programmed such that the second image process is executed after execution of the first image process;
   control means for controlling an image processing mechanism of said image processing apparatus by executing, based on the command train included in the received agent information, a control program that controls the image processing mechanism;
   execution means for executing one of the series of processes described in the work flow to be executed in said image processing apparatus; and
   transmission control means for controlling, responsive to said execution means terminating execution of the one process, a transmission process of automatically transmitting the agent information from said image processing apparatus to another of said plurality of image processing apparatuses so as to cause said another image processing apparatus to execute the command train based on the work flow.

12. A control method for controlling an image processing apparatus which can be connected to an external apparatus via a network, said control method comprising:
   a reception control step, of controlling a reception process of receiving agent information including a command train in which a work flow is programmed describing a series of processes to be executed in a plurality of image processing apparatuses, wherein the work flow further describes a first image process to be executed in the image processing apparatus and a second image process to be executed in an external image processing apparatus which is different in mechanism from the image processing apparatus, and wherein the work flow can be programmed such that the second image process is executed after execution of the first image process;
   a control step, of controlling an image processing mechanism of the image processing apparatus by executing, based on the command train included in the received agent information, a control program that controls the processing mechanism;
   a memory management step, of managing a memory area for executing the command train included in the received agent information;
   a transmission control step, of controlling, responsive to said control step terminating execution of the control program based on the command train, a transmission process of transmitting a process end notice to the external apparatus; and
   an obtainment step, of obtaining a reply to the process end notice from the external apparatus,
   wherein said memory management step includes releasing the memory area for executing the command train included in the received agent information in response to the reply being obtained from the external apparatus in said obtainment step.

13. A control method according to claim 12, wherein,
   said control step includes controlling the processing mechanism to execute a print process,
   said transmission control step includes controlling, responsive to the processing mechanism terminating execution of the print process, a transmission process of transmitting a print end notice to the external apparatus so as to cause the display unit of the external apparatus to display a print end confirmation window, and said obtainment step includes obtaining the reply sent from the external apparatus in response to a user of the external apparatus entering a print end confirmation.

14. A control method according to claim 12, further comprising an execution step, of executing the command train to determine whether a result of processing by the processing mechanism is an unrecoverable error, and if the result of processing is an unrecoverable error, writing the occurrence of the unrecoverable error to a memory area which is dynamically reserved for the agent information as a data field.

15. A control method for controlling an image processing apparatus which can be connected to a network, said control method comprising:

a reception control step, of controlling a reception process of receiving agent information including a command train in which a work flow is programmed describing a series of processes to be executed in a plurality of image processing apparatuses, wherein the work flow further describes a first image process to be executed in the image processing apparatus and a second image process to be executed in an external image processing apparatus which is different in function from the image processing apparatus, and wherein the work flow can be programmed such that the second image process is executed after execution of the first image process;

a control step, of controlling an image processing mechanism of the image processing apparatus by executing, based on the command train included in the received agent information, a control program that controls the processing mechanism;

an execution step, of executing one of the series of processes described in the work flow to be executed in the image processing apparatus; and a transmission control step, of controlling, responsive to said execution step terminating execution of the one process, a transmission process of automatically transmitting the agent information from the image processing apparatus to the external image processing apparatus so as to cause the external apparatus to execute the command train based on the work flow.

16. A control method according to claim 15, wherein the image processing apparatus is a printing apparatus and the external image processing apparatus is a filing apparatus.

17. A control method according to claim 15, wherein the image processing apparatus is a printer, and wherein the work flow is programmed such that the printer executes a print process and then transmits image data for printing to the external the image processing apparatus and such that the external the image processing apparatus stores the image data.

18. A control method according to claim 15, wherein said transmission control step includes controlling the transmission process to copy the agent information in whole or in part and distributing the copied agent information to at least one external image processing apparatus such that the series of processes described in the work flow may be executed in parallel.

19. A control method according to claim 15, wherein the agent information controls in the external image processing apparatus a process of voluntarily releasing a memory area reserved for the agent information while retaining the image data for printing processed by the agent information.

20. An office apparatus according to claim 15, wherein the processing mechanism includes at least one of an image filing mechanism, a scanner mechanism and a printer mechanism.

21. A computer program product embodying a program for implementing a control method of controlling an image processing apparatus which can be connected to an external apparatus via a network, said program comprising:

program code for a reception control step, of controlling a reception process of receiving agent information including a command train in which a work flow is programmed describing a series of processes to be executed in a plurality of image processing apparatuses, wherein the work flow further describes a first image process to be executed in the image processing apparatus and a second image process to be executed in an external image processing apparatus which is different in mechanism from the image processing apparatus, and wherein the work flow can be programmed such that the second image process is executed after execution of the first image process;

program code for a control step, of controlling an image processing mechanism of the image processing apparatus by executing, based on the command train included in the received agent information, a control program that controls the processing mechanism;

program code for a memory management step, of managing a memory area for executing the command train included in the received agent information;

program code for a transmission control step, of controlling, responsive to said control step terminating execution of the control program based on the command train, a transmission process of transmitting a process end notice to the external apparatus; and program code for an obtainment step, of obtaining a reply to the process end notice from the external apparatus, wherein said memory management step releases the memory area for executing the command train included in the received agent information in response to said obtainment step obtaining the reply from the external apparatus, and wherein said product is embodied in a medium so as to be executable by an apparatus.

22. A computer program product embodying a program for implementing a control method of controlling an image processing apparatus which can be connected to a network, said program comprising:

program code for a reception control step, of controlling a reception process of receiving agent information including a command train in which a work flow is programmed describing a series of processes to be executed in a plurality of image processing apparatuses, wherein the work flow further describes a first image process to be executed in the image processing apparatus and a second image process to be executed in an external image processing apparatus which is different in function from the image processing apparatus, and wherein the work flow can be programmed such that the second image process is executed after execution of the first image process;

program code for a control step, of controlling an image processing mechanism of the image processing apparatus by executing, based on the command train included in the received agent information, a control program that controls the processing mechanism;

program code for an execution step, of executing one of the series of processes described in the work flow to be executed in the image processing apparatus; and program code for a transmission control step, of controlling, responsive to said execution step terminating execution of the one process, a transmission process of automatically transmitting the agent information from the image processing apparatus to the external image processing apparatus so as to cause the external apparatus to execute the command train based on the work flow, wherein said product is embodied in a medium so as to be executable by an apparatus.

23. A computer-readable memory medium which stores a program for controlling an image processing apparatus which can be connected to an external apparatus via a network, said memory medium comprising program codes that allow the image processing apparatus to execute:

a reception control step, of controlling a reception process of receiving agent information including a command train in which a work flow is programmed describing a series of processes to be executed in a plurality of image processing apparatuses, wherein the work flow further describes a first image process to be executed in the image processing apparatus and a second image process to be executed in an external image processing apparatus which is different in mechanism from the image processing apparatus, and wherein the work flow can be programmed such that the second image process is executed after execution of the first image process;

a control step, of controlling an image processing mechanism of the image processing apparatus by executing, based on the command train included in the received agent information, a control program that controls the processing mechanism;

a memory management step, of managing a memory area for executing the command train included in the received agent information;

a transmission control step, of controlling, responsive to said control step terminating execution of the control program based on the command train, a transmission process of transmitting a process end notice to the external apparatus; and an obtainment step, of obtaining a reply to the process end notice from the external apparatus, wherein said memory management step includes releasing the memory area for executing the command train included in the received agent information in response to the reply being obtained from the external apparatus in said obtainment step.

24. A computer-readable memory medium which stores a program for controlling an image processing apparatus which can be connected to a network, said memory medium comprising program codes that allow the image processing apparatus to execute:

a reception control step, of controlling a reception process of receiving agent information including a command train in which a work flow is programmed describing a series of processes to be executed in a plurality of image processing apparatuses, wherein the work flow further describes a first image process to be executed in the image processing apparatus and a second image process to be executed in an external image processing apparatus which is different in function from the image processing apparatus, and wherein the work flow can be programmed such that the second image process is executed after execution of the first image process;

a control step, of controlling an image processing mechanism of the image processing apparatus by executing, based on the command train included in the received agent information, a control program that controls the processing mechanism;

an execution step, of executing one of the series of processes described in the work flow to be executed in the image processing apparatus; and a transmission control step, of controlling, responsive to said execution step terminating execution of the one process, a transmission process of automatically transmitting the agent information from the image processing apparatus to the external image processing apparatus so as to cause the external apparatus to execute the command train based on the work flow.

25. An image forming apparatus which can be connected to a network, said apparatus comprising:

reception control means for controlling a reception process of receiving agent information including a command train in which a work flow is programmed describing a series of processes to be executed in a plurality of image forming apparatuses, wherein the work flow further describes a first image process to be executed in said image forming apparatus and a second image process to be executed in an external image forming apparatus which is different in function from said image forming apparatus;

control means for controlling an image forming mechanism of said image forming apparatus by executing, based on the command train included in the received agent information, a control program that controls the image forming mechanism;

execution means for executing one of the series of processes described in the work flow to be executed in said image forming apparatus; and transmission control means for controlling a transmission process of transmitting the agent information from said image forming apparatus to the external image forming apparatus so as to cause the external image forming apparatus to execute the command train based on the work flow.

26. An image forming apparatus according to claim 25, wherein the work flow can be programmed such that the second image process in the external image forming apparatus is executed after execution of the first image process in said image forming apparatus.

27. An image forming apparatus according to claim 25, wherein said transmission control means controls the transmission process responsive to said execution means terminating execution of the one process.

28. An image forming apparatus according to claim 25, wherein said image forming apparatus is an image output apparatus that includes a printer and the external forming apparatus is an image input apparatus that includes a filing apparatus.

29. A control method for controlling an image forming apparatus which can be connected to a network, said control method comprising:

a reception control step, of controlling a reception process of receiving agent information including a command train in which a work flow is programmed describing a series of processes to be executed in a plurality of image forming apparatuses, wherein the work flow further describes a first image process to be executed in the image forming apparatus and a second image process to be executed in an external image forming apparatus which is different in function from the image forming apparatus;

a control step, of controlling an image forming mechanism of the image forming apparatus by executing, based on the command train included in the received agent information, a control program that controls the image forming mechanism;

an execution step, of executing one of the series of processes described in the work flow to be executed in the image forming apparatus; and a transmission control step, of controlling a transmission process of transmitting the agent information from the image forming apparatus to the external image forming apparatus so as to cause the external image forming apparatus to execute the command train based on the work flow.

30. A control method according to claim 29, wherein the work flow can be programmed such that the second image process in the external image forming apparatus is executed after execution of the first image process in the image forming apparatus.

31. A control method according to claim 29, wherein said transmission control step includes controlling the transmission process responsive to said execution step terminating execution of the one process.

32. A control method according to claim 19, wherein the image forming apparatus is an image output apparatus that includes a printer and the external forming apparatus is an image input apparatus that includes a filing apparatus.

33. A computer-readable memory medium which stores a program for controlling an image forming apparatus which can be connected to a network, said memory medium comprising program codes that allow the image forming apparatus to execute:

a reception control step, of controlling a reception process of receiving agent information including a command train in which a work flow is programmed describing a series of processes to be executed in a plurality of image forming apparatuses, wherein the work flow further describes a first image process to be executed in the image forming apparatus and a second image process to be executed in an external image forming apparatus which is different in function from the image forming apparatus;

a control step, of controlling an image forming mechanism of the image forming apparatus by executing, based on the command train included in the received agent information, a control program that controls the image forming mechanism;

an execution step, of executing one of the series of processes described in the work flow to be executed in the image forming apparatus; and a transmission control step, of controlling a transmission process of transmitting the agent information from the image forming apparatus to the external image forming apparatus so as to cause the external image forming apparatus to execute the command train based on the work flow.

* * * * *

UNITED STATES PATENT AND TRADEMARK OFFICE
CERTIFICATE OF CORRECTION

| | | |
|---|---|---|
| PATENT NO. | : 7,054,899 B1 | Page 1 of 1 |
| APPLICATION NO. | : 09/363025 | |
| DATED | : May 30, 2006 | |
| INVENTOR(S) | : Masahito Yamamoto | |

It is certified that error appears in the above-identified patent and that said Letters Patent is hereby corrected as shown below:

COLUMN 23
Line 49, "external the" should read --external--.
Line 50, "external the" should read --external--.

Signed and Sealed this

Nineteenth Day of December, 2006

JON W. DUDAS
*Director of the United States Patent and Trademark Office*